(12) United States Patent
Vennemann et al.

(10) Patent No.: US 7,588,178 B2
(45) Date of Patent: Sep. 15, 2009

(54) CONNECTING CONDUITS FOR FLUIDS (75) Inventors: Olav Vennemann, Wallenhorst (DE); Axel Meyer, Hamburg (DE); F. Jorge Dos Santos, Luneburg (DE)

(73) Assignee: Acergy UK Limited, Bucksburn, Aberdeen (GB)

( * ) Notice: Subject to any disclaimer, the term of this patent is extended or adjusted under 35 U.S.C. 154(b) by 861 days.

(21) Appl. No.: 10/416,352

(22) PCT Filed: Nov. 8, 2001

(86) PCT No.: PCT/GB01/04957

§ 371 (c)(1),
(2), (4) Date: Dec. 15, 2003

(87) PCT Pub. No.: WO02/39004

PCT Pub. Date: May 16, 2002

(65) Prior Publication Data

US 2004/0089342 A1    May 13, 2004

(30) Foreign Application Priority Data

Nov. 8, 2000  (GB) .................................. 0027277.3

(51) Int. Cl.
*B23K 20/12* (2006.01)
(52) U.S. Cl. ..................... 228/112.1; 228/2.1
(58) Field of Classification Search ............. 228/112.1, 228/2.1, 153, 5.1; 285/193, 194, 197, 198, 285/199, 288.5
See application file for complete search history.

(56) References Cited

U.S. PATENT DOCUMENTS

| 1,872,357 | A |   | 8/1932  | Straty |
| 3,937,245 | A |   | 2/1976  | Christie ..................... 137/318 |
| 3,995,655 | A | * | 12/1976 | Sands ........................ 137/318 |
| 5,244,236 | A | * | 9/1993  | Ninomiya ..................... 285/39 |

(Continued)

FOREIGN PATENT DOCUMENTS

FR          2381230         9/1978

(Continued)

OTHER PUBLICATIONS

Hot-Tapping on Pipelines, Piping and Equipment Manual: Design and Engineering Practice. Shell International. Dec. 1998.*

(Continued)

*Primary Examiner*—Jessica L Ward
*Assistant Examiner*—Megha Mehta
(74) *Attorney, Agent, or Firm*—Sheridan Ross P.C.

(57) ABSTRACT

The disclosed method & apparatus are for forming a fluid connection or tap through the wall of a pipeline, particularly intended for "hot tapping" of subsea pipelines. The method comprises fitting a connecting piece having a mounting surface which extends around the tap location and at least partially over the tap location and a connecting wall (2h) which surrounds the tap location to provide an opening adapted for subsequent connection of a conduit to complete a fluid connection. The connecting piece is bonded to the pipeline by friction stitch welding performed inside said opening. The material at the tap location is removed (AC indicates after cutting) to define an aperture and provide said fluid connection surrounded closely by the weld between the connecting piece and the wall.

17 Claims, 5 Drawing Sheets

U.S. PATENT DOCUMENTS 5,538,173 A * 7/1996 Hummel ............... 228/44.5
6,045,028 A * 4/2000 Martin et al. ............ 228/112.1
6,419,142 B1 * 7/2002 Larsson ............... 228/2.1

FOREIGN PATENT DOCUMENTS

| GB | 2040202 |   | 8/1980 |
| GB | 2213276 |   | 8/1989 |
| GB | 2214118 |   | 8/1989 |
| JP | 11058010 | * | 3/1999 |
| WO | WO 930 4813 |   | 3/1993 |

OTHER PUBLICATIONS

Gibson et al.; "Engineering Applications of Friction Stitch Welding"; Feb. 14-17, 2000; Proceedings of ETCE/OMAE2000 Joint Conference Energy for the New Millennium; OMAE00-2161.

Meyer et al.; "Considerations on Robot Friction Stitch Welding For the Repair of Marine Structures"; Feb. 14-17, 2000; Proceedings of ETCE/OMAE2000 Joint Conference Energy for the New Millennium; OMAE00-2162.

ASME B31.4-1979 "Liquid Petroleum Transporting Piping Systems"; The American Society of Mechanical Engineers; 1979.

* cited by examiner

CONNECTING CONDUITS FOR FLUIDS

This invention relates to a method of welding a connecting piece to a pipeline or other vessel, to provide a fluid connection. The invention is particularly suitable for "hot-tapping", in which a branch connection is made onto an existing installation without interrupting the operation thereof. The invention may be applied generally in the construction and/or maintenance of fluid-handling installations, however, both onshore and offshore.

At present, the attachment of such fittings is effected either by the use of a fusion welding process or a mechanical clamp fitted with a non-metallic seal for pressure and fluid containment. A typical application of hot tapping is installing a branch connection to a pipeline and cutting into a pressurised pipeline without interrupting the flow of the fluids in the pipeline. It may also be used to fit a valve or other equipment to a vessel or tank.

Mechanical hot tapping clamps are designed to provide structural integrity and are of heavy construction and high cost. The sealing elements are manufactured in non-metallic materials and are subject to degradation when exposed to some fluids.

Fusion welding is typically done using arc welding techniques. A connecting wall (pipe stub), and a sleeve or saddle piece are generally welded around the tap location, and the finally a section of the pipe wall is removed from inside the stub. Standard forms of hot tapping joints with sleeves and/or saddles and different welding sequences are discussed in ASME Code for Pressure Piping B31. In welding a hot tap connection, it is necessary to pre-heat the weld area to avoid detrimental metallurgical effects and hydrogen cracking. Due to the high cooling effect of the fluids inside the pipeline, it is necessary to provide very intense heating methods such as induction of flame heating.

Maintaining adequate pre-heat temperature when welding hot-taps on pipes, tubulars or vessels containing fluids is extremely difficult. For example, flame heating torches are applied for several minutes in order to raise the temperature of the joint and welding can only be done for a brief period before the torches must be applied again. This is time consuming and accurate monitoring of the pre-heat-temperature is difficult Furthermore, there is a safety problem with using torches close to welders and serious accidents have occurred.

One successful alternative is to use induction heating to maintain the required temperature, as suggested in GB 2 213 276 and GB 2 214 118. However, the electrical power requirements are high (typically 300 kW) and this may be difficult to provide at remote locations. Furthermore, the induction heating and power generating equipment is costly, heavy and cumbersome.

For underwater attachments and hot tapping it is only possible to achieve acceptable weld integrity by working in a dry hyperbaric environment, as the high pressures experienced otherwise tend to drive gasses into the structure formed and weaken it.

WO-A-93/04813 (U.S. Pat. No. 5,469,617) proposes an alternative welding method known as Friction Stitch Welding. In this method of welding, a hole is bored through one workpiece and into the workpiece to which it is to be joined. A plug is then inserted into the bored hole and rotated under pressure. The frictional heat generated during this melts the plug which when allowed to cool forms a weld. A continuous welded joint may be built up from a number of these welds.

For further data on this general welding technique attention is drawn to the following articles:

*Engineering Applications of Friction Stitch Welding*—Gibson, D et al and *Considerations On Robotic Friction Stitch Welding For The Repair of Marine Structures*—Meyer A et al both at Proceedings of ETCE/OMAE 2000 Joint Conference: Energy for the Millennium Feb. 14-17 2000 New Orleans, USA. The first article mentioned above makes the suggestion to employ friction stitch welding for hot tapping applications. However, the need to apply forces of many kN at high rotational speeds makes it difficult to apply the known devices for welding the lengthy and convoluted outlines of a hot tapping saddle.

The present invention is concerned with providing an improved method of forming a fluid connection onto a pipeline or other vessel. In particular, a hot tapping method is sought, for underwater application, in which one or more of the above mentioned problems are alleviated.

The invention in a first aspect provides a method of forming a fluid connection (hereinafter referred to as a tap) through a first wall at a desired tap location, the method comprising:

fitting against the first wall a connecting piece which comprises (i) a mounting surface formed so as to fit against the first wall, the material of said mounting surface extending around the tap location and (ii) a connecting wall surrounding the tap location providing an opening adapted for subsequent connection of a conduit to complete said fluid connection, the material of said mounting surface further extending at least partially within said opening;

bonding the material of the connecting piece to that of the first wall by means of a welding operation performed through said opening, the resulting weld surrounding the tap location and being surrounded in turn by the connecting wall; and removing the material of the first wall at the tap location thereby to define an aperture and provide said fluid connection surrounded by the weld between the connecting piece and the wall.

By performing the welding operation inside the opening of the connecting piece, the length of the weld is reduced, but importantly the path of the welding head is greatly simplified. This is of particular benefit in the case of friction stitch welding, where high reaction forces are required in the supporting structure.

It is noted at this point that GB-A-2040202 discloses a method and apparatus for welding a hollow member to a tubular member using a laser welding head that is disposed into the hollow member. The workpiece is rotated to form an internal weld between the hollow member and the tubular member. This known method and apparatus are for use in forming tubular steel structures, presumably on land, and there is not suggestion of their use in forming fluid connections generally, or or "hot tapping" in particular The welding operation may in particular comprise a friction welding operation, such as friction stitch welding. The welding may be performed without use of a hyperbaric chamber, and without pre-heating the material of the first wall or connecting piece. The method may be performed as part of a hot-tapping operation in a working installation, or during construction. The method may be performed onshore or offshore, and may be performed under water.

The first wall at the tap location may be a curved surface. The first wall may for example be a pipe wall. The connecting piece in this case will generally comprise a saddle-shaped member.

The connecting wall may provide a flange mounting at its end remote from the mounting surface, for connecting said conduit over the opening of the connecting piece. The opening in the connecting piece may be formed larger than the aperture formed at the tap location, in accordance with the dimensions of a welding head. In any case, however, the formation of the weld within the diameter of the connecting wall involves a weld of smaller dimensions and simpler shape than conventional methods, in which the weld extends around the outside of the saddle-shaped connecting piece.

The welding step may be performed using a welding head carried on a frame adapted for connecting to the connecting piece, the welding head being driven within said frame to complete said welding operation at locations within the opening and surrounding the tap location. In the case of friction stitch welding, the welding head may be stepped to successive locations, at each location fusing a plug of material to the material of the connecting piece and the first wall, the locations ultimately overlapping so as to form a continuous weld of said fused material.

The mounting surface of the connecting piece may extend at least partially over the tap location, the method including the step of removing material of the connecting piece. The removing step may comprise cutting simultaneously through the material of the connecting piece and the wall. At its simplest, the opening of the connecting piece may be entirely closed until said material is removed.

In a preferred embodiment, the material is removed by cutting through the welded portions of the first wall and the connecting piece. This avoids leaving any gap between the two materials between the opening and the weld, where fluid pressure and/or chemical attack would otherwise tend to open the weld. The material may alternatively be removed by cutting at a distance inside of the weld. This leaves a small gap, but not on the scale of the prior art, where the weld is formed outside the connecting wall altogether.

In accordance with a second aspect of the present invention there is provided a method of hot-tapping a connecting piece to a pipeline or other surface, wherein the connecting piece has a central well, which method includes locating the connecting piece, locating and fixing the welding apparatus with respect to the connecting piece so that the welding head of the apparatus can be operated within the well of the connecting piece, boring a hole through a surface of the connecting piece in the well and into the pipeline or other surface, locating a plug in the hole bored, applying a load with the welding head and rotating the welding head and plug so that the frictional heat and pressure generated between the plug and sides of the bored hole cause the plug material to flow and form a weld, repeating the steps of boring a hole and forming a weld until a suitable welded joint is formed and cutting through the pipeline or other surface to form a flow passage.

The general method of welding used in this method is Friction Stitch Welding. This is a solid phase operation, and problems with dissipation of heat and the need to continually supply this to the articles being welded are alleviated. This is due to the fact that as the heat generation between the plug and the sides of the bored hole can be controlled to meet the required conditions.

In addition as a solid phase operation is being used there are no sparks or ignition sources being generated which means the method is suitable for use in explosive environments.

In one embodiment of the invention the holes are bored and the welds formed in an overlying pattern. The use of an overlying pattern enables a continuous weld to be formed which surrounds the flow passage.

The connecting piece for use with the present invention may have a base in the central well which may be cut away at the same time as the wall of the pipeline to form the flow passage.

Further when the pipeline is cut to form the flow passage a part of the welded joint may also be removed. By cutting away a part of the welded joint a smooth surface free from any crevices may be formed. A possible source of corrosion is thereby avoided.

In an alternative arrangement sealing means may be used to negate the existence of crevices.

The present invention has been developed for use in situations where high heat dissipation occurs, for example, where there is a large body of fluid adjacent the surface to which the hot-tap is being fitted. Typical examples of these circumstances are with a large vessel or tank where a valve is being fitted to during service, or sub-sea operations.

In both of these cases, an important factor to be considered is the size of the apparatus being used and the need to rotate the workpiece with respect to said apparatus. Clearly with a hot-tap the apparatus has to be rotated rather than the workpiece and when this is considered along with the need to transport the apparatus to the site size is important.

The invention further provides apparatus adapted for use in the methods of the invention set forth above, and to apparatus and installations formed by connecting two or more conduits or other vessels by the methods according to the invention, as set forth above.

BRIEF DESCRIPTION OF THE DRAWINGS

Embodiments of the invention will now be described, by way of example only, by reference to the accompanying drawings, in which.

Throughout the drawings, the legends "BC" and "AC" are used to show the outline of the workpiece before cutting (BC) and after cutting (AC).

DETAILED DESCRIPTION OF THE EMBODIMENTS

Figure 1:
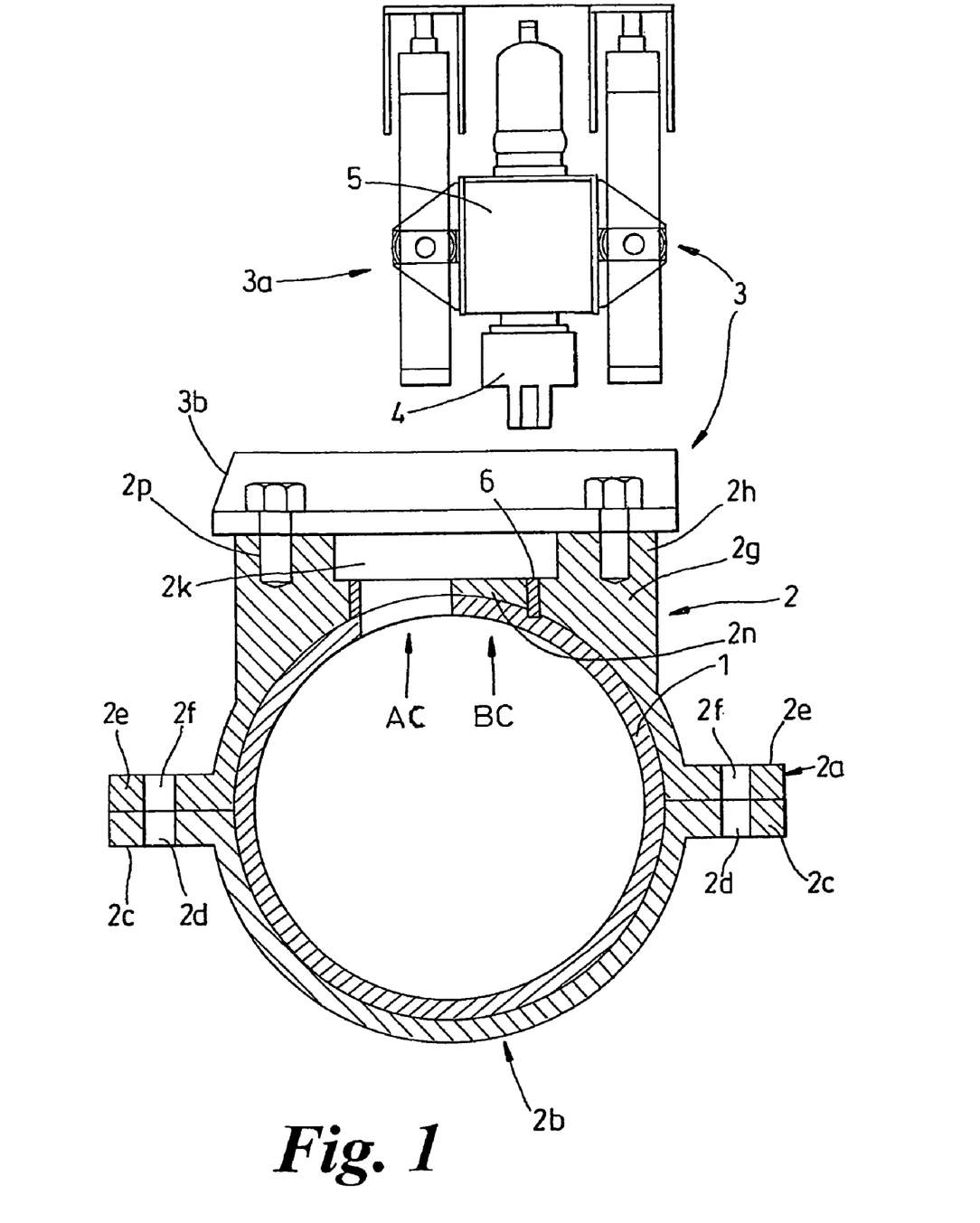
FIG. 1 shows a schematic view of a pipeline having a connecting piece fitted thereto in accordance with the present invention.

FIG. 1 shows a pipeline 1 with a connecting piece 2 having an upper section 2a and a lower section 2b located thereabouts. The inner surfaces of the upper and lower sections 2a,2b are curved so that when fitted about a pipeline of the required diameter they engage the surface of the pipeline.

The lower section 2b of the connecting piece comprises a longitudinally extending semi-circular section with longitudinal flanges 2c. The flanges 2c are each provided with a series of through-bores 2d.

The upper section of the connecting piece 2 includes a longitudinally extending semi-circular section with longitudinal flanges 2e with a series of through-bores 2f provided therein. A main body section 2g is provided on the upper section 2a and has a circumferentially extending wall 2h with a central well 2k located within the wall 2h. In the particular example shown here the central well has a base 2n.

Further fitting means 2p are provided in the upper surface of the wall 2h for subsequent fitting of a pipe or other equipment as desired.

In use the upper and lower sections 2a,2b are fitted about the pipe line 1 so that the respective through-bores 2d and 2f are in alignment. The two sections of the connecting piece are then bolted together and drawn into contact with the surface of the pipeline.

The connecting piece 2 may then be friction stitch welded to the pipeline. To do this welding apparatus 3 is located on the wall 2h of the connecting piece and bolted in place in fixing means on the connecting piece. In this example the fixing piece comprises a simple flange seat provided with threaded holes 2p in the upper surface of the wall 2h. The apparatus 3 may include a rotatable welding head 4 with drive motor 5 which is mounted so that it may be positionally adjusted with respect to the connecting piece. The positional adjustment may be both vertically and axially about an axis extending vertically through the well 2k of the connecting piece 2. The apparatus 3 in the FIG. 1 is shown schematically simply to show the location of the apparatus on the connecting piece 2. In practice, the apparatus will comprise a friction stitch welding head such as is described in the references cited in the introduction, mounted on a frame, and driven by means (not shown) so as to step-rotate to each stitch position.

Figure 2:
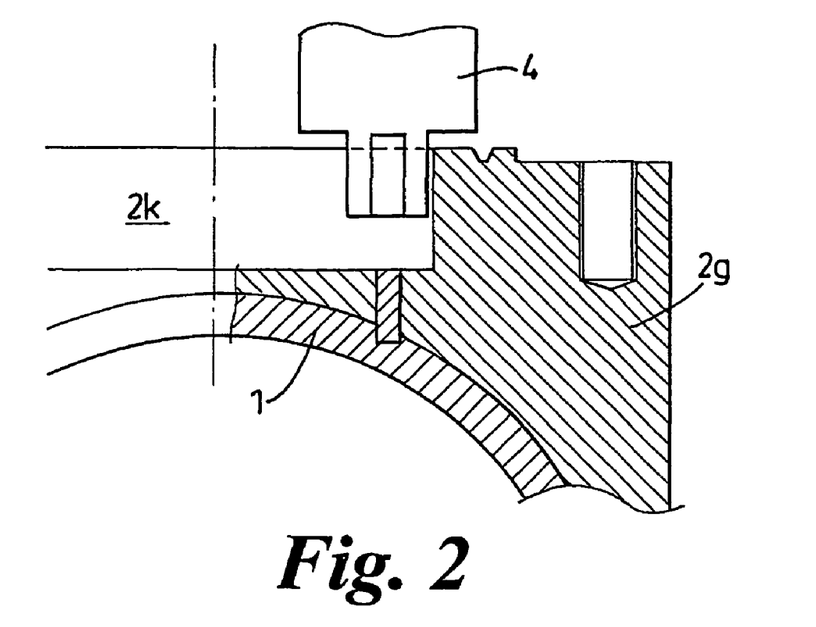
FIG. 2 shows a schematic view of the welding head during the fitting of the connecting piece shown in FIG. 1.
Figure 3:
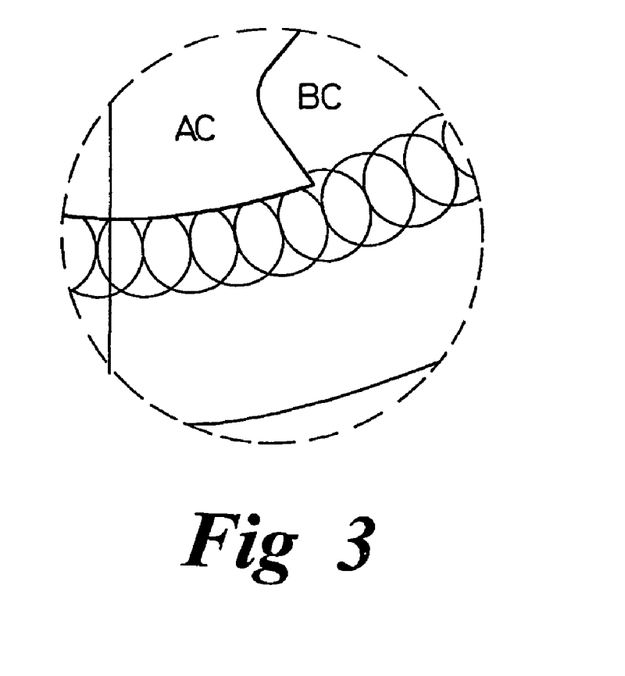
FIG. 3 shows a schematic view of suitable welding pattern for forming of a continuous weld.
Figure 4A:
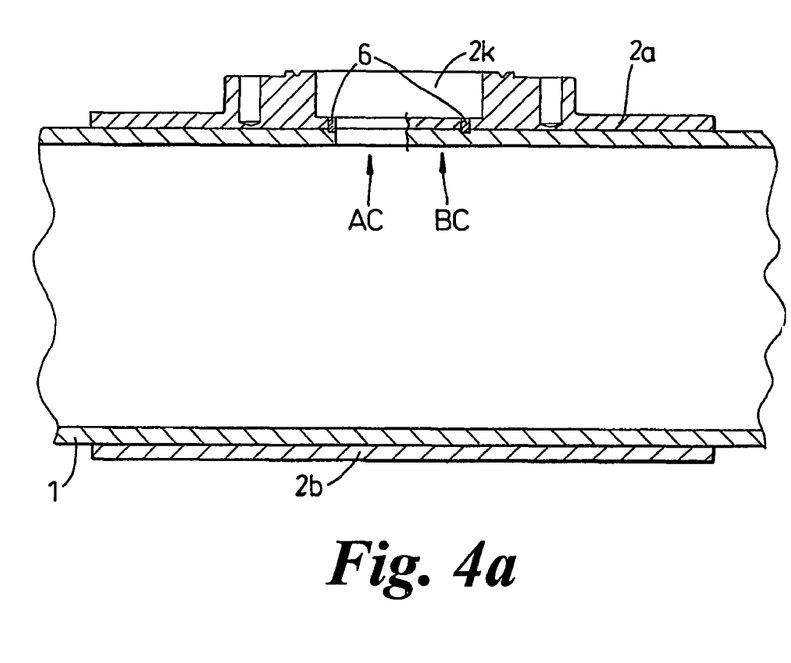
FIGS. 4a & 4b show a first form of connecting piece fitted to a pipeline.
Figure 4B:
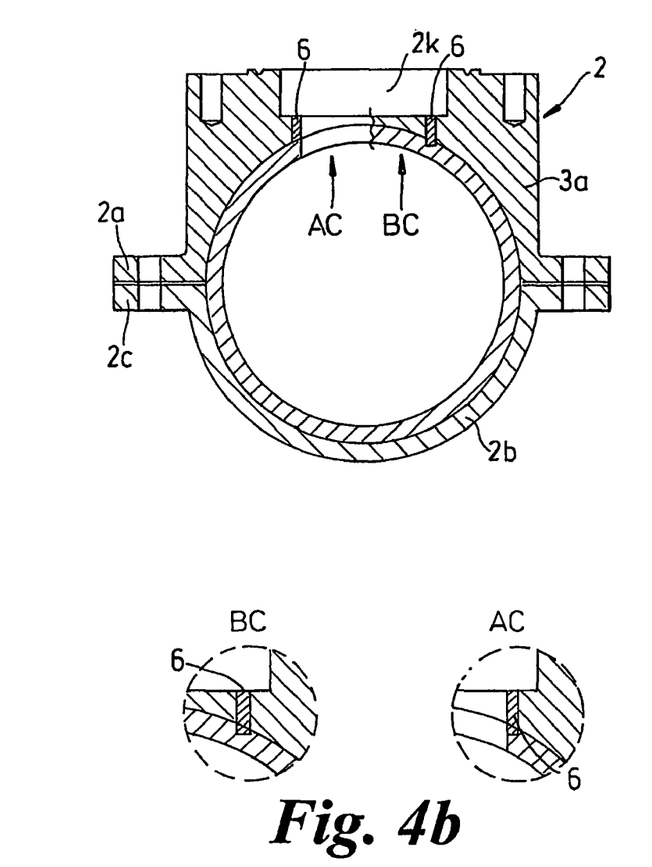

Referring also to FIGS. 2, 3 and 4, in operation, when the apparatus 3 has been located on the connecting piece 2 a first hole is bored through the base of the central well 2k of the connecting piece and into the wall of pipeline 1. The hole does not extend through the wall of the pipeline but extends into it, see FIG. 2 for greater detail. A plug 6 of suitable material is now located in the bore and the welding head of the apparatus lowered into position. The welding head of the apparatus engages the plug and applies a load while rotating the plug in the hole. The heat generated by the engagement of the plug with the sides of the hole is sufficient to plasticise melt the plug 6 so that the metal flows under pressure, forming a metallic bond with the parent material.

The above operation of boring a hole and forming a weld is repeated until the connecting piece is secured to the pipeline. To form a continuous welded joint around circumference of the well 2k the bores and welds are made so that they overlap, see FIG. 3 in a set sequence to maximise efficiency. Typically, a spaced series of these "stitches" will be made on a first pass, and then intermediate stitches are formed to provide the overlap. Depending on the tooling arrangement, it may be preferred to drill a number of bores in one phase of operation, and then insert and drive the plugs in another phase.

When the weld has been formed, the base of the central well 2k and the corresponding section of the pipeline are cut free and removed. Throughout the drawings, the legends "BC" and "AC" are used to show the outline of the workpiece before cutting (BC) and after cutting (AC). In order to avoid a lip in the surface formed by this cutting operation the cut may be made so that a part of the weld formed is also removed. Different types of cutting process may be envisaged, including those generally known and used in prior hot tapping systems. The cutting can be carried out for example with high precision mechanical trepanning cutter which is available on the market. It is preferable to ensure that the cut is made though the friction stitch weld in such a way that a small part of the friction stitch weld is removed and no crevice remains on the cutting surface between the saddle fitting and the pipe surface.

It should be noted that the space required for operation of the apparatus 3 in the central well 2k means that the well 2k is of larger diameter than is strictly required for the flow passage that will be formed in the connecting piece.

Once the weld has been formed and the flow passage accessed the apparatus 3 may be removed and a pipe or other desired equipment attached to the connecting piece 2 by means of the flange seat 2p. In a hot tapping situation, the open conduit must obviously be isolated from the surrounding environment. The solutions applied in known hot tapping systems can be applied equally here.

Figure 5A:
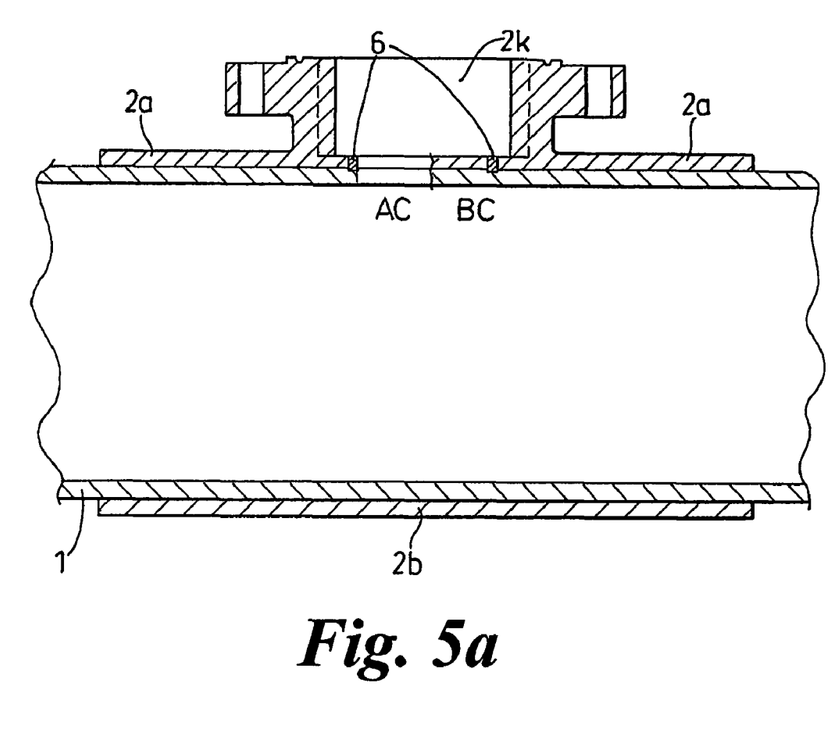
FIGS. 5a & 5b show a second form of connecting piece fitted to a pipeline.
Figure 5B:
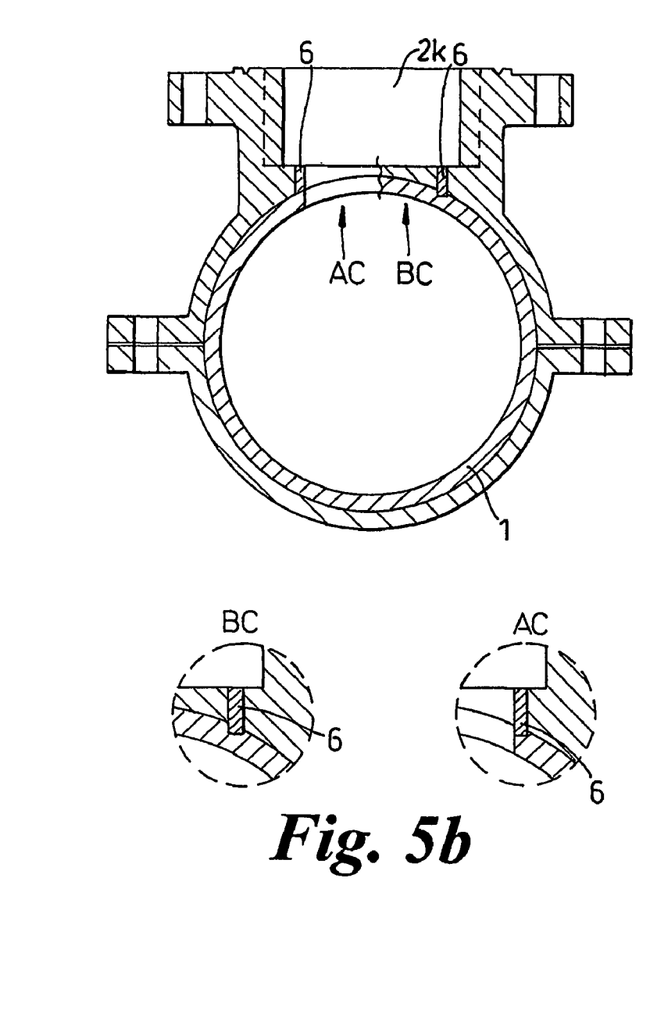

Now referring to FIGS. 4 and 5 of the drawings there is shown two types of connecting piece fitted to a pipeline with like components being given like references. These two connecting pieces differ from one another in the shaping of the flange and are designed to meet different operational criteria.

Figure 6:
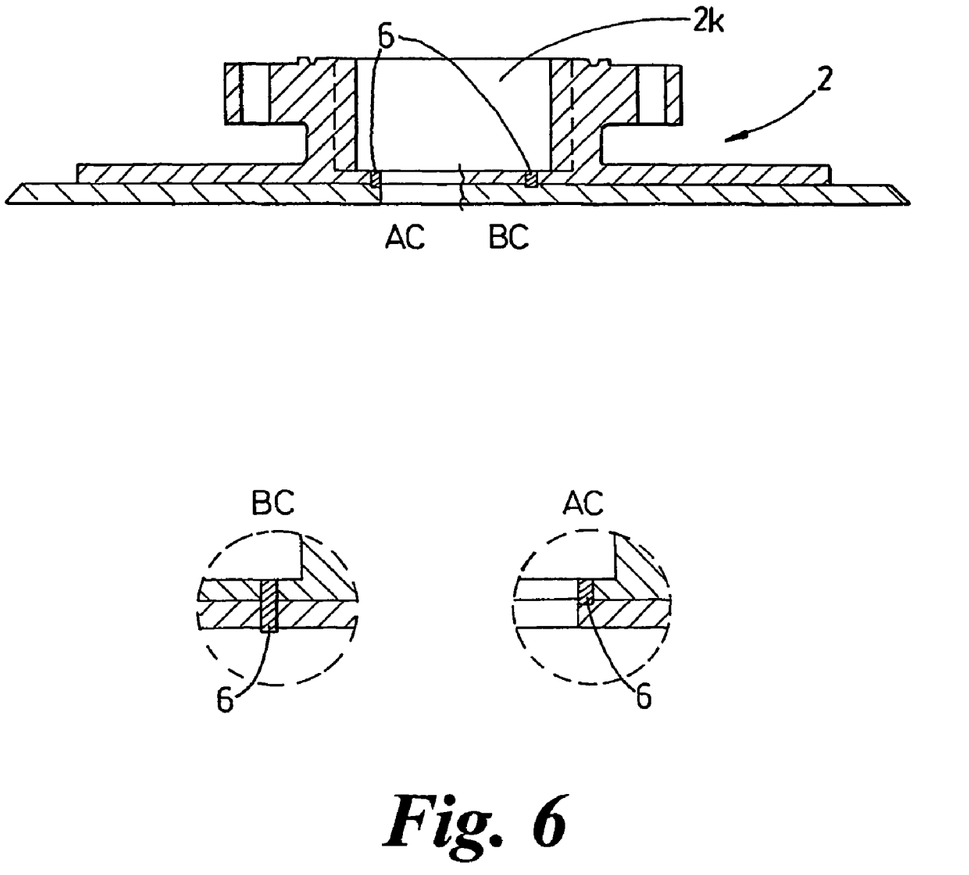
FIG. 6 shows a connecting piece fitted to a flat sided vessel.

While the invention has been described for fitting of a connecting piece to a pipeline the method is equally suited to use with fixing a suitable fitting to other components. For example, for fitting of a connecting piece or other fitting to another form of tubular section or a flat section such as the wall of a vessel or tank. FIG. 6 of the drawings shows the connecting piece 2 shown in FIG. 5 of the drawings adapted and fitted to a flat-sided vessel.

While the techniques described are particularly advantageous in the context of hot-tapping operations sub-sea, there is no reason why the same should not be applied to hot tapping on land and structures above water, or to the construction of new installations, on- or off-site, as well as the modification and repair of existing installations.

The specific embodiments and applications disclosed are in no way limiting on the scope of protection sought, which will be defined by the language of the appended claims.

The invention claimed is:

1. A method of forming a tap through a metallic first wall at a desired tap location, the method comprising:
   fitting against the metallic first wall a metallic connecting piece which comprises (i) a metallic mounting surface formed so as to fit directly against the metallic first wall and (ii) a metallic connecting wall surrounding the tap location providing an opening adapted for subsequent connection of a metallic conduit to complete said fluid connection, the material of said metallic mounting surface further extending at least partially within said opening;
   bonding the material of the metallic connecting piece to that of the metallic first wall by means of a welding operation performed through said opening, the resulting weld surrounding the tap location and being surrounded in turn by the metallic connecting wall; and
   subsequently removing the material of the metallic first wall at the tap location thereby to define an aperture and provide said conduit to complete said fluid connection surrounded by the weld between the metallic connecting piece and the wall.

2. A method according to claim 1, wherein the method is performed as part of a hot-tapping operation in a working installation.

3. A method according to claim 1, wherein the method is performed off-line as part of construction.

4. A method according to claim 1, wherein the tap is formed under water.

5. A method according to claim 1, wherein the metallic first wall at the tap location is a curved surface.

6. A method according to claim 1, wherein the metallic first wall is a pipe wall, and the metallic connecting piece comprises a saddle-shaped mounting surface.

7. A method according to claim 1, wherein the metallic connecting wall provides a flange mounting at its end remote from the metallic mounting surface, for connecting said metallic conduit over the opening of the metallic connecting piece.

8. A method according to claim 1, wherein the opening in the metallic connecting piece is formed larger than the aperture formed at the tap location, in accordance with the dimensions of a welding head used in the welding operation.

9. A method according to claim 1, wherein the welding operation is performed using a welding head carried on a frame adapted for connection to the metallic connecting piece, the welding head being driven within said frame to complete said welding operation at locations within the opening and surrounding the tap location.

10. A method according to claim 9, wherein the welding head is stepped to successive locations, at each location fusing a plug of metallic material to the metallic material of the metallic connecting piece and the metallic first wall, the locations ultimately overlapping so as to form a continuous weld of said fused material.

11. A method according to claim 1, wherein the welding operation is a friction welding operation.

12. A method according to claim 1, wherein the metallic mounting surface of the metallic connecting piece extends at least partially over the tap location, the method including the step of removing material of the metallic connecting piece.

13. A method according to claim 12, wherein the step of removing material comprises cutting simultaneously through the metallic material of the connecting piece and the wall.

14. A method according to claim 13, wherein the material is removed by cutting through the welded portions of the metallic first wall and the metallic connecting piece.

15. A method according to claim 1, wherein said welding operation comprises:
    boring a hole through the metallic mounting surface of the metallic connecting piece within the opening and into the metallic first wall, locating a metallic plug in the hole bored, applying a load with a welding head and rotating the welding head and plug so that frictional heat and pressure generated between the plug and sides of the bored hole cause the metallic plug material to flow and form a weld, repeating the steps of boring a hole and forming a weld until a continuous welded joint is formed, and cutting through the metallic first wall to form a flow passage surrounded by said welded joint.

16. A method of forming a tap through a metallic first wall at a desired tap location, the method comprising:
    fitting against the metallic first wall a metallic connecting piece which comprises (i) a metallic mounting surface formed so as to fit directly against the metallic first wall, and (ii) a metallic connecting wall surrounding the tap location and providing an opening adapted for subsequent connection of a metallic conduit to complete said fluid connection, the material of said metallic mounting surface extending at least partially within said opening;
    bonding the material of the metallic connecting piece to that of the metallic first wall by means of a welding operation performed through said opening;
    said welding operation comprising boring a hole through the metallic mounting surface of the metallic connecting piece within the opening and into the metallic first wall, locating a metallic plug in the hole thus bored, applying a load with a welding head and rotating the welding head and plug so that frictional heat and pressure generated between the plug and the bored hole cause the metallic plug material to flow and form a weld, and repeating the steps of boring a hole and forming a weld until a continuous welded joint is formed; and
    cutting through at least the metallic first wall at the tap location to define an aperture to provide said fluid connection, the aperture being surrounded by said welded joint.

17. The method of claim 16, in which said metallic mounting surface extends across and forms a closed end to said metallic connecting wall, and in which said cutting step is performed through the welded joint to remove portions of both said metallic first wall and said metallic mounting surface to form said aperture.

* * * * *

UNITED STATES PATENT AND TRADEMARK OFFICE
CERTIFICATE OF CORRECTION

PATENT NO. : 7,588,178 B2  Page 1 of 1
APPLICATION NO. : 10/416352
DATED : September 15, 2009
INVENTOR(S) : Olav Vennemann, Axel Meyer and F. Jorge Dos Santos

It is certified that error appears in the above-identified patent and that said Letters Patent is hereby corrected as shown below:

Title Page, Item (73) Assignee should read:

(73) Assignee: Acergy UK Limited, Bucksburn, Aberdeen (GB) and
GKSS Forschungszentrum Geesthacht GMBH, Germany Signed and Sealed this Third Day of August, 2010

David J. Kappos
*Director of the United States Patent and Trademark Office*